UNITED STATES PATENT OFFICE

GEORG KRÄNZLEIN, MARTIN CORELL, HEINRICH VOLLMANN, AND EMIL HAUSDÖRFER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

ORTHO-HALOGENANTHRAQUINONECARBOXYLIC ACID AND PROCESS OF PREPARING IT

No Drawing. Application filed August 21, 1928, Serial No. 301,162, and in Germany September 9, 1927.

Our present invention relates to ortho-halogenanthraquinonecarboxylic acids and process of preparing them.

The ortho-halogenanthraquinonecarboxylic acids have hitherto been prepared by starting from the corresponding ortho-halogenmethylanthraquinones. This method can, however, not be applied for preparing the said carboxylic acids on a technical scale.

Now we have found that the ortho-halogenanthraquinonecarboxylic acids can be prepared in a simple manner by diazotizing an ortho-aminoanthraquinonesulfonic acid, transforming the diazo compound in the usual manner with cuprous cyanide into the ortho-cyanoanthraquinonesulfonic acids, converting the latter by saponification into the corresponding ortho-carboxylic acids and then treating the latter with halogen or an agent splitting off halogen, the halogen atom entering the position of the sulfo group. The course of the reaction may be illustrated by the following scheme:

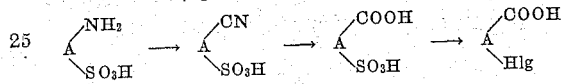

wherein A stands for an anthraquinone radical which may be substituted by halogen, and Hlg for a halogen atom.

The halogen-ortho-carboxylic acids are valuable intermediate products for the manufacture of dyestuffs.

The following examples illustrate our invention, but they are not intended to limit it thereto, the parts being by weight:

(1) 160 parts of 1-aminoanthraquinone-2-sulfonic acid of the formula:

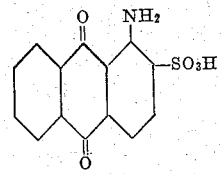

are dissolved in 3 parts of water and acidified with 150 parts of concentrated hydrochloric acid. The mass is then diazotized at ordinary temperature with the calculated quantity of a solution of $NaNO_2$. After a short heating to 50° C. the separated light-brown diazonium salt is filtered by suction, washed for a short time with water and then introduced at ordinary temperature into a potassium-cuprous cyanide solution prepared from 250 parts of copper sulfate and 280 parts of potassium cyanide in 1500 parts of water. When the reaction is complete the whole is heated for a short time to 70° C. and then filtered by suction. The 1-cyanoanthraquinone-2-sulfonic acid thus obtained has the formula:

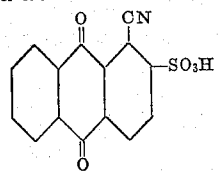

In order to purify it, it is boiled with a dilute solution of sodium carbonate and then saponified by boiling it with dilute caustic soda solution. On acidifying there is obtained the light yellowish-brown 2-sulfoanthraquinone-1-carboxylic acid of the formula:

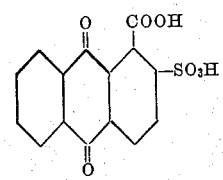

which can easily be recrystallized from water. 20 parts of the dried product are dissolved in 400 parts of hot water, 80 parts of concentrated hydrochloric acid are added and 6 parts of sodium chlorate dissolved in water are gradually run into the mixture, drop by drop, at 80° C. while stirring. The whole mass is stirred at about 80° C. to 90° C. for several hours until all 2-sulfoanthraquinone- 1-carboxylic acid is transformed into the 2-chloroanthraquinone-1-carboxylic acid of the formula:

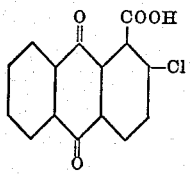

The latter which precipitates in the form of a yellowish crystalline magma is filtered by suction. It is washed with hot water, dissolved, so as to purify it, in a sodium carbonate solution and reprecipitated with hydrochloric acid. When recrystallized from nitrobenzene it forms almost white laminæ melting at 176° C. to 177° C.

(2) 300 parts of 2-aminoanthraquinone-3-sulfonic acid of the formula:

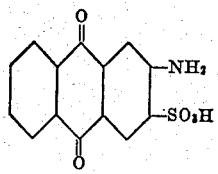

preferably precipitated as a sulfate from the sulfonation liquor, are diazotized at ordinary temperature with 100 parts of sodium nitrite, whereby the colorless diazo anhydride of the amino-sulfonic acid is formed. After filtration by suction, the mass is washed until neutral and the paste is introduced into a sodium-cuprous cyanide solution prepared by dissolving 250 parts of cupric sulfate and 280 parts of sodium cyanide in 3000 parts of water. The 2-cyanoanthraquinone-3-sulfonic acid of the formula:

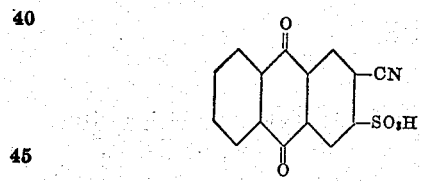

precipitates in the form of light yellow crystals, a strong evolution of nitrogen taking place. After a short heating to 60° C. to 70° C. the mass is filtered by suction and washed until neutral with a dilute solution of sodium chloride. The product may then be saponified by boiling it with an alkali. By this operation, however, the sulfo group is partly split off so that it is preferable to dry the cyanosulfonic acid, dissolve it in five times its weight of sulfuric acid of 66° Bé. and running in drop by drop so much water that there is attained a boiling point of the sulfuric acid of 160° C. The difficultly soluble cyanosulfonic acid is at first precipitated, but afterwards dissolution and clarification takes place. After half an hour's boiling the saponification is finished. By furthermore diluting the liquor the concentration is selected in such a manner, that on cooling, the 2-sulfoanthraquinone-3-carboxylic acid of the formula:

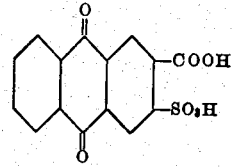

precipitates in the form of colorless needles. The sulfocarboxylic acid is soluble in water and can be recrystallized from it. It is dissolved in 5000 parts of water, 200 parts of concentrated hydrocloric acid are added thereto and a solution of 100 parts of sodium chlorate in 100 parts of water is run drop by drop into the solution so obtained. Thus the 2-chloroanthraquinone-3-carboxylic acid of the formula:

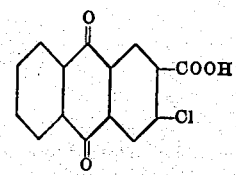

gradually precipitates in a very pure state and with a good yield. When recrystallized from nitrobenzene it shows the melting point of 285° C.

Instead of the 2-aminoanthraquinone-3-sulfonic acid there may also be used the 1-bromo-2-aminoanthraquinone-3-sulfonic acid, whereby the 1-bromo-3-chloroanthraquinone-2-carboxylic acid is obtained having the formula:

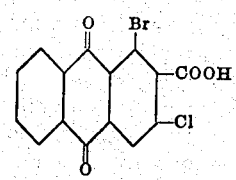

(3) 200 parts of sodium 1-amino-4-bromoanthraquinone-2-sulfonate of the formula:

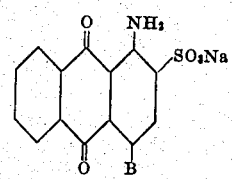

are transformed into the hydrochloride in about 3000 parts of water with concentrated hydrochloric acid. The quantity of sodium nitrite required for the diazotization is then dissolved in 2000 parts of water and this solution is run into the mass, while stirring. After a short heating to 60° C. to 70° C. the brownish diazonium salt precipitates in a beautiful crystalline form. The diazonium salt is introduced at ordinary temperature into a potassium-cuprous cyanide solution prepared from 250 parts of copper sulfate and 280 parts of potassium cyanide in 1500 parts of water. When the reaction is complete, the product is heated for a short time to 70° C. It is then filtered by suction and the 1-cyano-4-bromoanthraquinone-2-sulfonic acid of the formula:

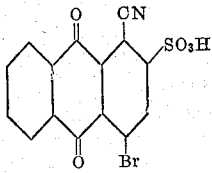

is obtained in the form of somewhat brownish silver-gray laminæ. It is rather readily soluble in water. By boiling it in dilute caustic soda solution it is easily saponified and there precipitates the difficultly water-soluble sodium salt of the 4-bromo-2-sulfoanthraquinone-1-carboxylic acid of the formula:

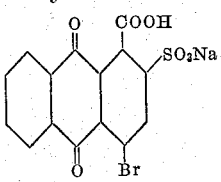

The product is filtered and by acidifying it, the carboxylic acid is liberated which precipitates in the form of light brown laminæ. The acid can well be recrystallized from water. 20 parts of the dried product are then dissolved in 400 parts of hot water, 80 parts of concentrated hydrochloric acid are added thereto and into this mixture are gradually run in drop by drop at 80° C., while stirring, 5 parts of sodium chlorate dissolved in water. The mass is stirred for several hours at 80° C., to 90° C. until all 4-bromo-2-sulfoanthraquinone-1-carboxylic acid has been transformed into the 4-bromo-2-chloroanthraquinone-1-carboxylic acid of the formula:

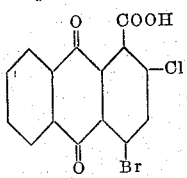

The latter precipitates in the form of a yellowish crystalline magma which is filtered by suction. It is washed with hot water, dissolved, so as to purify it, in a solution of sodium carbonate and reprecipitated with hydrochloric acid.

(4) 400 parts of 2.6-diaminoanthraquinone-3.7-disulfonic acid of the formula:

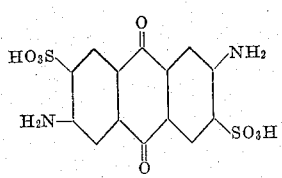

are diazotized with 200 parts of sodium nitrite in the manner indicated in Example 2 and the gray diazo anhydride which precipitates is separated. The moist diazo anhydride is entered into a solution of 13 parts of copper sulfate and 1500 parts of sodium cyanide in 8000 parts of water and by gently heating there is completed the separation of the brownish dicyano-disulfonic acid of the formula:

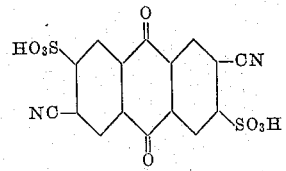

The acid is well washed with a solution of sodium chloride, dried and saponified as described in Example 2. The resulting disulfodicarboxylic acid of the formula:

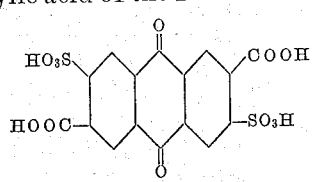

is dissolved in 10000 parts of water, 600 parts of concentrated hydrochloric acid are added thereto and a solution of 300 parts of sodium chlorate in 300 parts of water is run into the mixture drop by drop at 90° C. to 95° C., while stirring. The 3.7-dichloro-2.6-anthraquinonedicarboxylic acid of the formula:

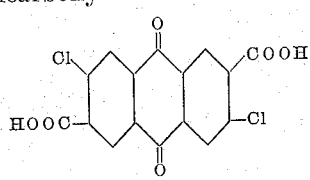

gradually precipitates. It crystallizes from nitrobenzene in colorless needles melting at over 300° C.

The transformation of the ortho-sulfoanthraquinone-carboxylic acids into the corresponding halogencarboxylic acids cannot only be effected by means of chlorate and hydrochloric acid as indicated in the preceding examples, but also by means of a free halogen, for instance, by introducing chlorine into the warm aqueous solution of the sulfocarboxylic acids.

Instead of the ortho-aminoanthraquinonesulfonic acids used in the preceding examples there may also be used orthoaminoanthraquinonesulfonic acids with other substituents.

We claim:
1. The process of preparing ortho-halogenanthraquinone-carboxylic acids comprising the steps of diazotizing an ortho-aminoanthraquinonesulfonic acid, which may be substituted by halogen, transforming the diazo compound by means of cuprous cyanide into the ortho-cyanoanthraquinonesulfonic acid, converting the latter by saponification into the corresponding ortho-sulfocarboxylic acid and then treating the latter with a halogen or an agent capable of splitting off halogen, the halogen atom entering the place of the sulfo group.

2. The process of preparing ortho-halogenanthraquinone-carboxylic acids comprising the steps of diazotizing an ortho-aminoanthraquinonesulfonic acid of the formula:

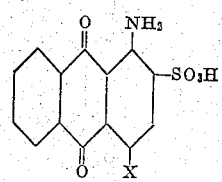

wherein X stands for hydrogen or halogen, transforming the diazo compound by means of cuprous cyanide into the ortho-cyanoanthraquinonesulfonic acid, converting the latter by saponification into the corresponding ortho-sulfocarboxylic acid and then treating the latter with a halogen or an agent capable of splitting off halogen, the halogen atom entering the place of the sulfo group.

3. The process of preparing 2-chloro-anthraquinone-1-carboxylic acid comprising the steps of diazotizing 1-amino-anthraquinone-2-sulfonic acid, transforming the diazo compound by means of cuprous cyanide into the 1-cyano-anthraquinone-2-sulfonic acid, converting the latter by saponification into the 2-sulfo-anthraquinone-1-carboxylic acid and then treating it with a mixture of chlorate and hydrochloric acid, the sulfo group being replaced by chlorine.

4. As a new product, 4-bromo-2-chloranthraquinone-1-carboxylic acid of the formula:

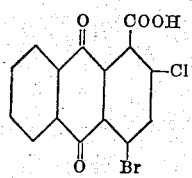

forming yellowish crystals.

5. The process of preparing ortho-halogenanthraquinone-carboxylic acids comprising the steps of diazotizing an ortho-aminoanthraquinonesulfonic acid of the formula:

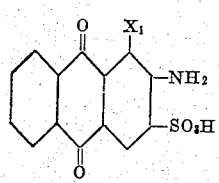

wherein $X_1$ stands for hydrogen or halogen transforming the diazo compound by means of cuprous cyanide into the ortho-cyanoanthraquinonesulfonic acid, converting the latter by saponification into the corresponding ortho-sulfocarboxylic acid and then treating the latter with a halogen or an agent capable of splitting off halogen, the halogen atom entering the place of the sulfo group.

6. The process of preparing 2-chloroanthraquinone-3-carboxylic acid comprising the steps of diazotizing 2-amino-anthraquinone-3-sulfonic acid, transforming the diazo compound by means of cuprous cyanide into the 2-cyano-anthraquinone-3-carboxylic acid and then treating it with a mixture of chlorate and hydrochloric acid whereby the sulfo group is replaced by chlorine.

In testimony whereof, we affix our signatures.

GEORG KRÄNZLEIN.
MARTIN CORELL.
HEINRICH VOLLMANN.
EMIL HAUSDÖRFER.